United States Patent
Kai et al.

(10) Patent No.: US 10,218,243 B2
(45) Date of Patent: Feb. 26, 2019

(54) MOTOR STRUCTURE FOR ELECTROLYTIC CORROSION PROTECTION OF BEARING

(71) Applicant: TOP CO., LTD., Echizen-Shi, Fukui (JP)

(72) Inventors: Takayuki Kai, Echizen (JP); Kenji Sasaki, Echizen (JP); Hiroaki Asakura, Echizen (JP)

(73) Assignee: TOP CO., LTD., Echizen-Shi, Fukui (JP)

( * ) Notice: Subject to any disclaimer, the term of this patent is extended or adjusted under 35 U.S.C. 154(b) by 240 days.

(21) Appl. No.: 15/316,558

(22) PCT Filed: Aug. 10, 2015

(86) PCT No.: PCT/JP2015/072613
§ 371 (c)(1),
(2) Date: Dec. 6, 2016

(87) PCT Pub. No.: WO2016/039058
PCT Pub. Date: Mar. 17, 2016

(65) Prior Publication Data
US 2017/0187262 A1  Jun. 29, 2017

(30) Foreign Application Priority Data

Sep. 9, 2014 (JP) ................................. 2014-182876

(51) Int. Cl.
| | |
|---|---|
| *H02K 7/08* | (2006.01) |
| *H02K 5/16* | (2006.01) |
| *H02P 27/08* | (2006.01) |
| *H02K 5/15* | (2006.01) |
| *H02K 5/167* | (2006.01) |
| *H02K 5/173* | (2006.01) |

(52) U.S. Cl.
CPC ............... *H02K 7/083* (2013.01); *H02K 5/15* (2013.01); *H02K 5/161* (2013.01); *H02K 5/167* (2013.01);
(Continued)

(58) Field of Classification Search
CPC .......... H02K 7/083; H02K 5/15; H02K 5/161; H02K 5/167; H02K 5/1732; H02K 2205/03; H02P 27/08; Y02T 10/641
See application file for complete search history.

(56) References Cited

U.S. PATENT DOCUMENTS 5,212,999 A  5/1993 Kitada
5,945,754 A  8/1999 Fulwood et al.
(Continued)

FOREIGN PATENT DOCUMENTS

CN  202918103 U  5/2013
GB  2305993 A  4/1997
(Continued)

OTHER PUBLICATIONS

The First Office Action dated May 4, 2018 for the corresponding Chinese Patent Application No. 201580030207.6. Including English translation.
(Continued)

*Primary Examiner* — Emily P Pham
(74) *Attorney, Agent, or Firm* — Troutman Sanders LLP

(57) ABSTRACT

A rolling bearing has an inner ring attached to a rotating shaft out of contact with a first end surface, and an outer ring is fitted onto an inner peripheral surface of a housing in contact with the first end surface. A sliding element is provided between a second end surface and the first end surface. A retaining portion is provided between the sliding element and the first end surface. A biasing portion is provided between the retaining portion and the first end surface to bias the retaining portion toward a second side in a lamination direction. The rotating shaft, the housing, the inner ring, the outer ring, a rolling element, the sliding element, the retaining portion, and the biasing portion are formed of a conductive material. The rotating shaft and the
(Continued)

housing are electrically connected by the sliding element, the retaining portion, and the biasing portion.

12 Claims, 2 Drawing Sheets

(52) U.S. Cl.
CPC ........... *H02K 5/1732* (2013.01); *H02P 27/08* (2013.01); *H02K 2205/03* (2013.01)

(56) References Cited

U.S. PATENT DOCUMENTS

| | | | | |
|---|---|---|---|---|
| 6,543,781 | B1* | 4/2003 | Rehm | F16C 33/765 277/410 |
| 6,608,422 | B2* | 8/2003 | Bartman | F16C 25/08 310/219 |
| 7,859,145 | B2* | 12/2010 | Rapp | H02K 1/187 310/43 |

FOREIGN PATENT DOCUMENTS

| | | |
|---|---|---|
| JP | H05219708 A | 8/1993 |
| JP | H09291943 A | 11/1997 |
| JP | H11-69704 A | 3/1999 |
| JP | 2002139066 A | 5/2002 |
| JP | 2008263698 A | 10/2008 |
| JP | 2011-135722 A | 7/2011 |
| JP | 2014132818 A | 7/2014 |

OTHER PUBLICATIONS

Notice of Reasons for Rejection dated Nov. 7, 2017 during the prosecution of Japanese Patent Application No. 2016-547782.
Extended European Search Report dated Jan. 30, 2018 for the corresponding European Patent Application No. 15839444.5.
PCT International Search Report dated Oct. 27, 2015 issued in corresponding to PCT International Application No. PCT/JP2015/072613.

\* cited by examiner

MOTOR STRUCTURE FOR ELECTROLYTIC CORROSION PROTECTION OF BEARING

CROSS-REFERENCE TO RELATED APPLICATIONS

This is a U.S. national phase application under 35 U.S.C. § 371 of International Patent Application No. PCT/JP2015/072613, filed Aug. 10, 2015, and claims benefit of priority to Japanese Patent Application No. 2014-182876, filed Sep. 9, 2014. The entire contents of these applications are hereby incorporated by reference.

TECHNICAL FIELD

The present invention relates to a motor.

BACKGROUND

A technique related to a motor has been proposed. For example, a brushless motor is disclosed in Japanese Unexamined Patent Application Publication No. H05-219708. This brushless motor includes a housing having a tubular portion. A bearing is attached to an inner surface of the housing. A thrust plate is held at a corresponding position of a shaft. A rotor yoke having a rotor magnet is secured to the shaft. A steel ball is secured to an end surface of the shaft.

An electric motor that is driven by an inverter device is disclosed in Patent Literature 2. In this electric motor, a first sliding element is attached to a shaft end portion of a conductive rotating shaft of a rotator. The rotating shaft is borne in a rotatable state by a rolling bearing. The rolling bearing is held at an outer ring by a conductive bracket. A conductive cover is attached to the bracket. A second sliding element is attached to the cover. The second sliding element comes into contact with the sliding element by a biasing force of a conductive elastic body. The elastic body is a flat spring or the like. According to this electric motor, when the electric motor is driven by the inverter device, the two sliding elements are continuously brought into sliding contact with each other, and accordingly, electric charge generated on the rotating shaft can be released to a fixed portion such as the bracket not via the rolling bearing. It is possible to prevent electrolytic corrosion of the rolling bearing and promote the enhancement of longevity of the electric motor. In addition, a rolling bearing including seal plates is disclosed in Japanese Unexamined Patent Application Publication No. H09-291943. The seal plates are made of a conductive flexible material, and are in contact with an inner ring and an outer ring.

An electric motor that can reduce electrolytic corrosion of a bearing is disclosed in Japanese Unexamined Patent Application Publication No. 2008-263698. This electric motor is driven by pulse-width modulation control. The electric motor includes a case, a stator core, a wire, a rotator core, a bearing, and an insulator. The case is grounded. The stator core is attached to the case. The wire is wound around the stator core. The rotator core is provided with a metal rotating shaft. The bearing has an outer ring and an inner ring. The outer ring is attached to the case. The inner ring supports the rotating shaft. The insulator is disposed, in contact with the bearing, on a path from the rotating shaft to the case via the baring. The insulator is set to 1 mm or more thick.

SUMMARY

In a motor, electrolytic corrosion may occur on a rolling bearing that is attached to a rotating shaft of a rotor to enable the rotor to rotate. Electrolytic corrosion causes the wearing out of predetermined respective portions forming the rolling bearing. In other words, electrolytic corrosion occurring on the rolling bearing becomes a cause of the generation of sound and vibration in the motor that is being driven. Hence, the inventors have studied a countermeasure against electrolytic corrosion targeting a rolling bearing that is attached to an end portion of a rotating shaft.

An object of the present invention is to provide a motor that can reduce electrolytic corrosion of a rolling bearing that is attached to an end portion of a rotating shaft of a rotor.

An aspect of the present invention is a motor including a rotor supported in a rotatable state and a stator including: a housing provided to a portion of the stator, the portion being on a first side in a lamination direction in which electrical steel sheets forming a rotor core of the rotor are laminated, the housing including a tubular housing chamber, and formed of a conductive material; a rolling bearing including an inner ring formed of a conductive material, an outer ring formed of a conductive material, and a rolling element formed of a conductive material, the inner ring being attached to an end portion of a rotating shaft formed of a conductive material of the rotor on the first side in the lamination direction in a state of not being in contact with a first end surface of the housing chamber on the first side in the lamination direction, the outer ring being fitted onto an inner peripheral surface of the housing chamber in a state of being in contact with the first end surface of the housing chamber; a sliding element formed of a conductive material and provided in the lamination direction between a second end surface of the rotating shaft on the first side in the lamination direction and the first end surface of the housing chamber; a retaining portion formed of a conductive material and provided in the lamination direction between the sliding element and the first end surface of the housing chamber; and a biasing portion formed of a conductive material, provided in the lamination direction between the retaining portion and the first end surface of the housing chamber, and configured to bias the retaining portion toward a second side in the lamination direction, wherein the rotating shaft and the housing are electrically connected by the sliding element, the retaining portion, and the biasing portion.

According to this motor, the rotating shaft and the housing are electrically connected by the sliding element, the retaining portion, and the biasing portion, and accordingly the inner and the outer ring of the rolling bearing can be electrically connected. The occurrence of a potential difference between the inner ring and the outer ring can be prevented. It becomes possible to bring stability to an electric potential between the inner ring and the outer ring. The sliding element is biased toward the second side in the lamination direction with a bias of the retaining portion by the biasing portion toward the second side in the lamination direction.

The housing chamber may include a first recess portion in an area, which is not in contact with the outer ring, of the first end surface of the housing chamber, and the retaining portion and the biasing portion may be housed in the first recess portion. According to this configuration, it is possible to prevent the retaining portion and the biasing portion from being displaced in a radial direction of the rotating shaft with a rotation of the rotor.

The rotating shaft may include a second recess portion on the second end surface of the rotating shaft, and the sliding element may be provided between the second end surface of the rotating shaft and the first end surface of the housing chamber in a state where a part of the sliding element is housed in the second recess portion. According to this configuration, it is possible to position the sliding element at a fixed position with respect to the rotating shaft in a state where the rotor is rotating.

The second recess portion may be provided at a central position in a radial direction of the rotating shaft, of the second end surface of the rotating shaft. According to this configuration, it is possible to eliminate a situation where the sliding element goes around on the retaining portion with the rotation of the rotor. It is possible to reduce sound and vibration when the motor is driven.

The sliding element may be a sphere. According to this configuration, it makes it possible that the sliding element slides smoothly between the second end surface of the rotating shaft and the retaining portion. The sliding element being a sphere can roll on the retaining portion with the rotation of the rotor and slide smoothly between the second end surface of the rotating shaft and the retaining portion.

According to the present invention, it is possible to obtain a motor that can reduce electrolytic corrosion of a rolling bearing that is attached to an end portion of a rotating shaft of a rotor.

DETAILED DESCRIPTION

Examples for carrying out the present invention will be described with reference to the drawings. The present invention is not limited to the configurations described below, and various configurations can be employed based on the same technical idea. For example, a part of the configurations shown below may be omitted or may be replaced by another configuration or the like. Another configuration may be included.

Figure 1:
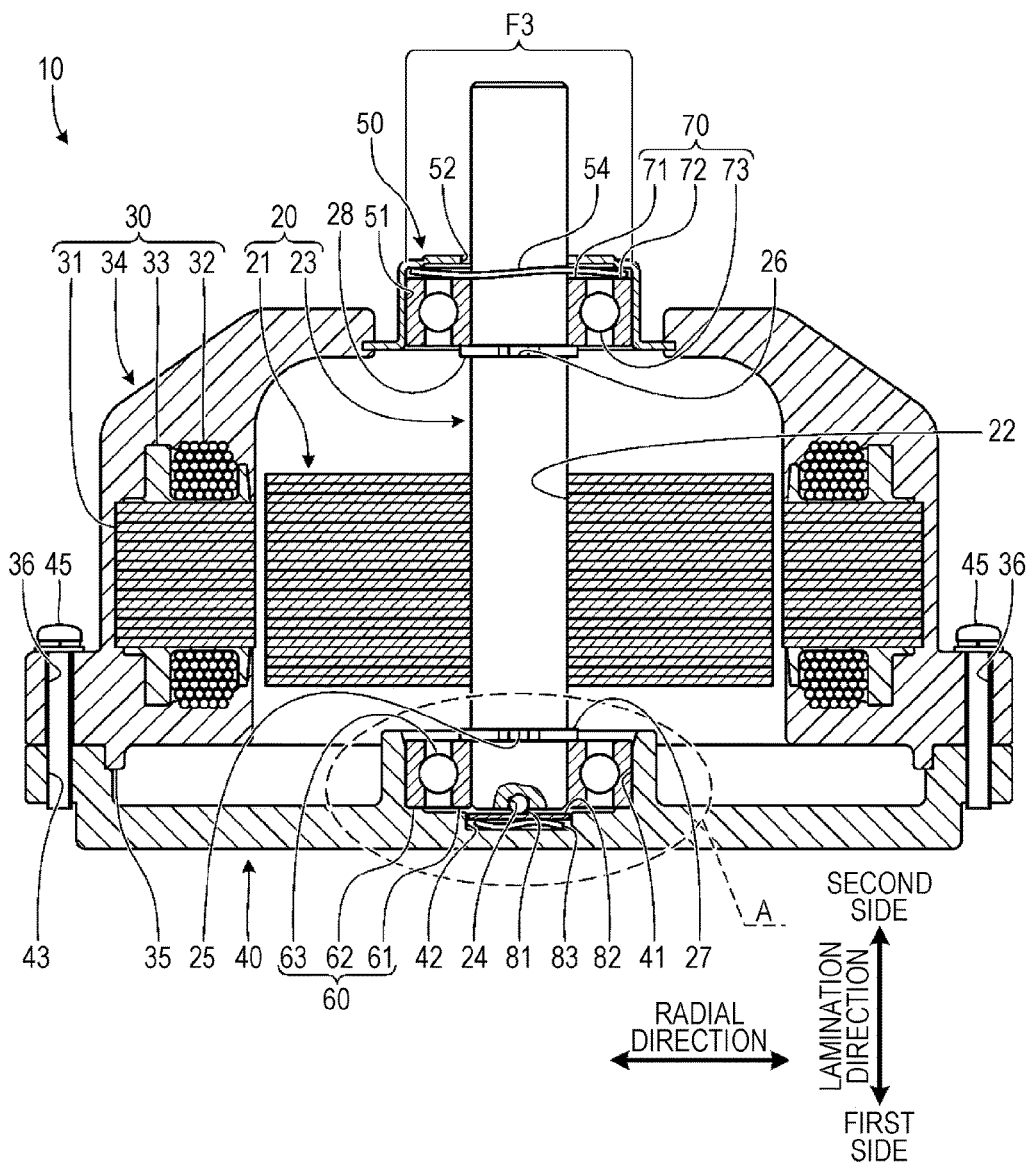
FIG. 1 is a cross-sectional view illustrating an example of a schematic configuration of a motor.
Figure 2:
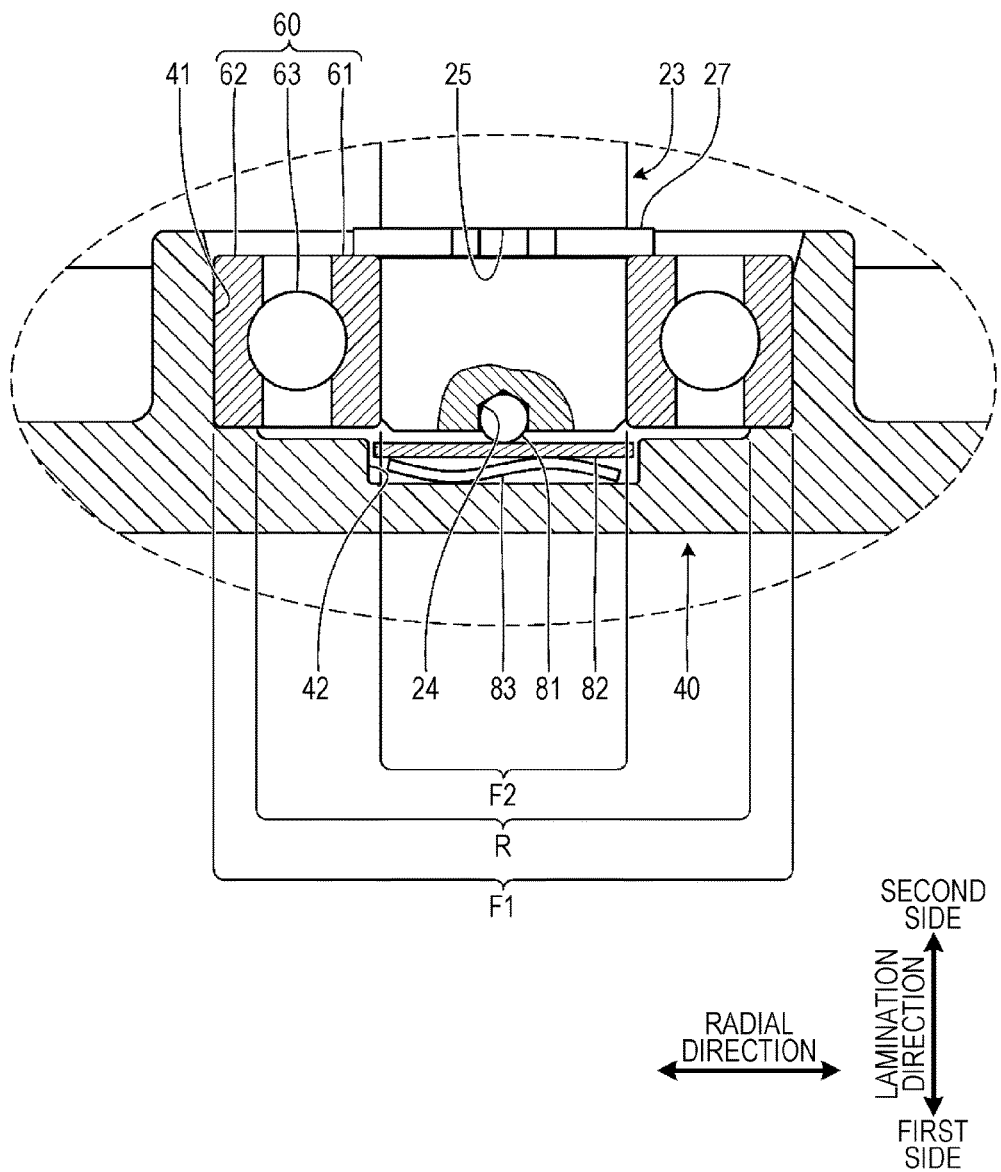
FIG. 2 is an enlarged cross-sectional view of a section A illustrated in FIG. 1.

A motor 10 is described with reference to FIGS. 1 and 2. In FIGS. 1 and 2, hatching indicates sectional locations. The motor 10 is mounted on various products. The motor 10 is used as, for example, a drive source that rotates a fan included in an air conditioner, and the like. In addition, the motor 10 may also be used as a drive source of a compressor. Furthermore, the motor 10 may also be used as a drive source of an electric vehicle. As the electric vehicle, an electric car, an electric bicycle, an electric wheelchair, an electric cart, or an electric food trolley is exemplified. The electric car includes a hybrid car.

The motor 10 is a brushless motor. The motor 10 is driven by an inverter. In this case, the motor 10 is, for example, controlled by PWM. As illustrated in FIG. 1, the motor 10 includes a rotor 20, a stator 30, a first housing 40, a second housing 50, a first rolling bearing 60, a second rolling bearing 70, a sliding element 81, a retaining portion 82, and a biasing portion 83. In the example, as illustrated in FIG. 1, a description will be described by using an example of a case where the motor 10 is a motor of an inner rotation type.

The rotor 20 includes a rotor core 21, a plurality of permanent magnets, and a rotating shaft 23. In FIG. 1, the illustration of the permanent magnets is omitted. The rotor core 21 is formed, for example, while electrical steel sheets are punched with a press machine, by laminating the punched electrical steel sheets. In the example, a direction in which the electrical steel sheets are laminated in the rotor core 21 is referred to as the "lamination direction." One side in the lamination direction is referred to as the "first side." The other side in the lamination direction is referred to as the "second side."

A through-hole 22 is formed in the rotor core 21. The through-hole 22 penetrates the rotor core 21 in the lamination direction. The through-hole 22 is formed at the center portion of the rotor core 21 as in a known rotor. The plurality of permanent magnets is mounted to the rotor core 21. For example, the plurality of permanent magnets is respectively housed in a plurality of spaces formed in the rotor core 21, the plurality of spaces being corresponding in number to the permanent magnets. If the rotor 20 is a rotor of such a type, the motor 10 is referred to as an Interior Permanent Magnet (IPM) motor. The plurality of permanent magnets may be mounted on an outer peripheral surface of the rotor core 21. If the rotor 20 is a rotor of such a type, the motor 10 is referred to as a Surface Permanent Magnet (SPM) motor.

The rotating shaft 23 is inserted in the through-hole 22 to be secured to the rotor core 21. The rotating shaft 23 is formed of a conductive material. For example, the rotating shaft 23 is formed by processing a steel round bar. In the example, a radial direction of the rotating shaft 23 is referred to as the "radial direction." The radial direction agrees with a radiation direction centered at the rotating shaft 23. The rotating shaft 23 includes a second recess portion 24. In the rotating shaft 23, the second recess portion 24 is formed at a central position in the radial direction of a second end surface F2 of the rotating shaft 23. The second end surface F2 of the rotating shaft 23 is an end surface of the rotating shaft 23 on the first side in the lamination direction (see FIG. 2). Each surface forming the second recess portion 24 is included on the second end surface F2 of the rotating shaft 23.

The stator 30 includes a stator core 31, a plurality of coils 32, an insulator 33, and a mold portion 34. The stator core 31 is formed, for example, while electrical steel sheets are punched with a press machine, by laminating the punched electrical steel sheets. A direction in which the punched electrical steel sheets are laminated in the stator core 31 agrees with the lamination direction. In other words, the direction in which the electrical steel sheets are laminated in the rotor core 21 and the direction in which the electrical steel sheets are laminated in the stator core 31 are the same direction (lamination direction). The coils 32 are provided to teeth of the stator core 31. The coil 32 is formed by winding a conducting wire around the tooth. Upon the formation of the coil 32, the insulator 33 is mounted on the stator core 31. The insulator 33 electrically insulates the stator core 31 and the coils 32.

The stator core 31 to which the coils 32 are provided via the insulator 33 is set in a mold of an injection molding machine in a state of being positioned. In this case, the second housing 50 is also set in the mold in a state of being positioned. The mold portion 34 is formed by resin molding with the injection molding machine. The mold portion 34 covers the stator core 31 to which the coils 32 are provided via the insulator 33. However, an inner peripheral surface of the stator core 31 is set in a state of being exposed from the mold portion 34. The inner peripheral surface of the stator core 31 is a surface facing the outer peripheral surface of the rotor core 21.

The first housing 40 includes a tubular first housing chamber 41. The first housing 40 is formed of a conductive material. For example, the first housing 40 is formed by processing a steel plate material. In the motor 10, the first housing 40 is provided to a portion on the first side in the lamination direction of the stator 30. In this case, the first housing 40 is positioned via a projection portion 35 formed on an end surface of the mold portion 34 on the first side in the lamination direction. The projection portion 35 is provided in a state of protruding toward the first side in the lamination direction. The projection portion 35 is formed, for example, into an annular shape. In other words, the first housing 40 is positioned with respect to the stator 30 by being fitted onto the projection portion 35. The first housing 40 is secured to the stator 30 in the state of being positioned with respect to the stator 30. Upon this securing, a plurality of bolts 45 is passed through a plurality of through-holes 36 formed in an outer peripheral portion of the mold portion 34. The plurality of through-holes 36 is formed at predetermined angular intervals. A plurality of screw holes 43 is formed in an outer peripheral portion of the first housing 40, correspondingly respectively to the through-holes 36. The bolts 45 passed through the through-holes 36 of the mold portion 34 are respectively screwed in the screw holes 43.

The second housing 50 includes a tubular second housing chamber 51. The second housing 50 is formed of a conductive material. For example, the second housing 50 is formed by processing a plate of the same material as the first housing 40. As mentioned above, the second housing 50, together with the stator core 31, is resin-molded to be supported by the mold portion 34 on the second side in the lamination direction. In other words, in the motor 10, the second housing 50 is provided to a portion on the second side in the lamination direction of the stator 30.

The first rolling bearing 60 and the second rolling bearing 70 are radial bearings. The first rolling bearing 60 and the second rolling bearing 70 are ball bearings. However, the first rolling bearing 60 and the second rolling bearing 70 may be roller bearings. The first rolling bearing 60 includes a first inner ring 61, a first outer ring 62, and a plurality of first rolling elements 63. The first inner ring 61, the first outer ring 62, and the first rolling elements 63 are formed of a conductive material. For example, the first inner ring 61, the first outer ring 62, and the first rolling elements 63 are formed of a steel material. The second rolling bearing 70 includes a second inner ring 71, a second outer ring 72, and a plurality of second rolling elements 73. The second inner ring 71, the second outer ring 72, and the second rolling elements 73 are formed of a conductive material. For example, the second inner ring 71, the second outer ring 72, and the second rolling elements 73 are formed of a steel material. Known rolling bearings can be employed as the first rolling bearing 60 and the second rolling bearing 70.

The first rolling bearing 60 is attached to the rotating shaft 23 and is fitted in the first housing chamber 41 of the first housing 40. In other words, in the first rolling bearing 60, the first inner ring 61 is attached to an end portion of the rotating shaft 23 on the first side in the lamination direction, and the first outer ring 62 is fitted onto an inner peripheral surface of the first housing chamber 41. In this case, the first inner ring 61 is set in a state of not being in contact with a first end surface F1 of the first housing chamber 41 on the first side in the lamination direction. The first outer ring 62 is set in a state of being in contact with the first end surface F1 of the first housing chamber 41 on the first side in the lamination direction. The first end surface F1 of the first housing chamber 41 is an end surface of the first housing chamber 41 on the first side in the lamination direction (see FIG. 2). In other words, the first end surface F1 of the first housing chamber 41 indicates surfaces excluding the inner peripheral surface of the first housing chamber 41 of respective surfaces forming the first housing chamber 41.

The first rolling bearing 60 is in contact at the first inner ring 61 with a first snap ring 27 attached to the rotating shaft 23 in a state where the first rolling bearing 60 is attached to the rotating shaft 23. The first snap ring 27 is attached to a first peripheral groove 25 formed in the rotating shaft 23. The first peripheral groove 25 is formed in the rotating shaft 23, corresponding to an attachment position of the first rolling bearing 60 to the rotating shaft 23. In other words, a movement of the first rolling bearing 60 toward the second side in the lamination direction is restricted by the first snap ring 27 in the state where the first rolling bearing 60 is attached to the rotating shaft 23.

The second rolling bearing 70 is attached to the rotating shaft 23 and fitted in the second housing chamber 51 of the second housing 50. In other words, in the second rolling bearing 70, the second inner ring 71 is attached to a portion of the rotating shaft 23, the portion protruding from the stator core 31 toward the second side in the lamination direction, and the second outer ring 72 is fitted onto an inner peripheral surface of the second housing chamber 51. The second rolling bearing 70 is in contact at the second inner ring 71 with a second snap ring 28 attached to the rotating shaft 23 in a state where the second rolling bearing 70 is attached to the rotating shaft 23. The second snap ring 28 is attached to a second peripheral groove 26 formed in the rotating shaft 23. The second peripheral groove 26 is formed in the rotating shaft 23, corresponding to an attachment position of the second rolling bearing 70 to the rotating shaft 23. In other words, a movement of the second rolling bearing 70 toward the first side in the lamination direction is restricted by the second snap ring 28 in the state where the second rolling bearing 70 is attached to the rotating shaft 23.

A wave washer 54 is provided in the lamination direction between a third end surface F3 of the second housing chamber 51 and the second rolling bearing 70. The third end surface F3 of the second housing chamber 51 is an end surface of the second housing chamber 51 on the second side in the lamination direction (see FIG. 1). In other words, the third end surface F3 of the second housing chamber 51 indicates surfaces excluding the inner peripheral surface of the second housing chamber 51 of respective surfaces forming the second housing chamber 51. Inner and outer diameters of the wave washer 54 are set to dimensions corresponding to the second outer ring 72 of the second rolling bearing 70. In other words, the wave washer 54 is not in contact with the second inner ring 71, and is in contact with the second outer ring 72. The wave washer 54 is compressed in the lamination direction by the third end surface F3 of the second housing chamber 51 and the second outer ring 72. Consequently, the second rolling bearing 70 is biased toward the first side in the lamination direction.

In a state where the second rolling bearing 70 is attached to the rotating shaft 23 and fitted in the second housing chamber 51 of the second housing 50, the rotating shaft 23 protrudes from the second housing 50 toward the second side in the lamination direction through the wave washer 54 and a through-hole 52. The through-hole 52 is a through-hole formed in the third end surface F3 of the second housing chamber 51. A portion, which protrudes from the second housing 50, of the rotating shaft 23 serves as an output shaft. A drive target configuration is attached, or a driven target side configuration is coupled, to the portion, which serves as the output shaft, of the rotating shaft 23.

The sliding element 81 is provided in the lamination direction between the second end surface F2 of the rotating shaft 23 and the first end surface F1 of the first housing chamber 41. In this case, a part of the sliding element 81 is housed in the second recess portion 24 of the rotating shaft 23. In other words, the sliding element 81 is provided between the second end surface F2 of the rotating shaft 23 and the first end surface F1 of the first housing chamber 41 in a state where the part of the sliding element 81 is housed in the second recess portion 24. The sliding element 81 is a sphere. The sliding element 81 is formed of a conductive material. For example, the sliding element 81 is a steel ball.

The retaining portion 82 is provided in the lamination direction between the sliding element 81 and the first end surface F1 of the first housing chamber 41. The retaining portion 82 is formed of a conductive material. For example, the retaining portion 82 is a steel circular plate. The sliding element 81 slides between the second end surface F2 of the rotating shaft 23 and the retaining portion 82 with a rotation of the rotor 20. In other words, the sliding element 81 being a sphere rolls on the retaining portion 82 in the state where the part of the sliding element 81 is housed in the second recess portion 24 with the rotation of the rotor 20.

The biasing portion 83 is provided in the lamination direction between the retaining portion 82 and the first end surface F1 of the first housing chamber 41. The biasing portion 83 biases the retaining portion 82 toward the second side in the lamination direction. The sliding element 81 is biased toward the second side in the lamination direction with a bias of the retaining portion 82 by the biasing portion 83 toward the second side in the lamination direction. The biasing portion 83 is, for example, a wave washer. The biasing portion 83 is formed of a conductive material. In other words, as the biasing portion 83, a steel wave washer is exemplified. As the biasing portion 83, a known wave washer can be employed.

The retaining portion 82 and the biasing portion 83 are housed in a first recess portion 42. The first recess portion 42 is a recess portion formed in an area R of the first end surface F1 of the first housing chamber 41. The area R is an area, which is not in contact with the first outer ring 62 of the first rolling bearing 60, of the first end surface F1 of the first housing chamber 41 (see FIG. 2). Each surface forming the first recess portion 42 is included on the first end surface F1 of the first housing chamber 41. The first recess portion 42 is set to be a recess portion in a shape corresponding to the shape of the retaining portion 82 in the radial direction.

<Advantageous Effects of Example>

According to the example, the following advantageous effects can be obtained.

(1) In the motor 10, the sliding element 81, the retaining portion 82, and the biasing portion 83 are provided in the lamination direction between the second end surface F2 of the rotating shaft 23 and the first end surface F1 of the first housing chamber 41 in the first housing 40 (see FIGS. 1 and 2). The first rolling bearing 60 is in contact at the first inner ring 61 with the rotating shaft 23, and is in contact at the first outer ring 62 with the inner peripheral surface of the first housing chamber 41 of the first housing 40. The sliding element 81 is in contact on the second side in the lamination direction with the second end surface F2 of the rotating shaft 23, and is in contact on the first side in the lamination direction with the second side in the lamination direction of the retaining portion 82. The retaining portion 82 is in contact on the first side in the lamination direction with the second side in the lamination direction of the biasing portion 83. The biasing portion 83 is in contact on the first side in the lamination direction with the first end surface F1 of the first housing chamber 41. The rotating shaft 23, the first housing 40, the sliding element 81, the retaining portion 82, and the biasing portion 83 are formed of a conductive material. In other words, the rotating shaft 23 and the first housing 40 are electrically connected by the sliding element 81, the retaining portion 82, and the biasing portion 83. Hence, the first inner ring 61 and the first outer ring 62 of the first rolling bearing 60 can be electrically connected. The occurrence of a potential difference between the first inner ring 61 and the first outer ring 62 can be prevented. It becomes possible to bring stability to an electric potential between the first inner ring 61 and the first outer ring 62. Electrolytic corrosion of the first rolling bearing 60 can be suppressed.

For example, a conductive lubricant may be applied to the second end surface F2 of the rotating shaft 23, the sliding element 81, and the retaining portion 82. As the lubricant, conductive grease or conductive oil is exemplified. The sliding property of each portion that comes into contact via the conductive lubricant can be improved. On the second end surface F2 of the rotating shaft 23, an area to which the conductive lubricant is applied may be the second recess portion 24 in which the sliding element 81 is housed.

(2) In the first housing chamber 41, the first recess portion 42 is provided in the area R on the first end surface F1 of the first housing chamber 41 (see FIGS. 1 and 2). The retaining portion 82 and the biasing portion 83 are housed in the first recess portion 42. Accordingly, it is possible to prevent the retaining portion 82 and the biasing portion 83 from being displaced in the radial direction with the rotation of the rotor 20.

(3) In the rotating shaft 23, the second end surface F2 is provided with the second recess portion 24 (see FIGS. 1 and 2). The sliding element 81 is in the state where the part of the sliding element 81 is housed in the second recess portion 24. Hence, it is possible to position the sliding element 81 at a fixed position with respect to the rotating shaft 23 in a state where the rotor 20 is rotating. The second recess portion 24 is provided at the central position in the radial direction on the second end surface F2 of the rotating shaft 23 (see FIGS. 1 and 2). Hence, it is possible to eliminate a situation where the sliding element 81 can go around on the retaining portion 82 with the rotation of the rotor 20. It is possible to reduce sound and vibration when the motor 10 is driven. The sliding element 81 is formed into a sphere (see FIGS. 1 and 2). Hence, the sliding element 81 is enabled to slide smoothly between the second end surface F2 of the rotating shaft 23 and the retaining portion 82. The sliding element 81 being a sphere rolls on the retaining portion 82 in the state where the part of the sliding element 81 is housed in the second recess portion 24 with the rotation of the rotor 20. The sliding element 81 slides smoothly between the second end surface F2 of the rotating shaft 23 and the retaining portion 82.

<Modifications>

The example can also be configured as follows. Some configurations of modifications illustrated below may also be employed in combination as appropriate. In the following description, points different from the above description are described, and the description of similar points is omitted as appropriate.

(1) The motor 10 is set to be a brushless motor (see FIG. 1). The above structure including the rotating shaft 23, the first housing 40, the first rolling bearing 60, the sliding element 81, the retaining portion 82, and the biasing portion 83 can also be employed for a motor of another type as in the above description. In other words, if a countermeasure is required against electrolytic corrosion of the rolling bearing attached to the end portion of the rotating shaft, the end portion being opposite to the output shaft side, a structure similar to the above one can be employed irrespective of the type of motor. The opposite of the output shaft side corresponds to the first side in the lamination direction in the above-mentioned example.

(2) The motor 10 is set to be the motor 10 of the inner rotation type (see FIG. 1). The motor may be a motor of an outer rotation type. In other words, the above structure including the rotating shaft 23, the first housing 40, the first rolling bearing 60, the sliding element 81, the retaining portion 82, and the biasing portion 83 can also be employed for the motor of the outer rotation type as in the above description. The motor of the outer rotation type is a known motor. Therefore, a description of the motor of the outer rotation type is omitted.

(3) The rotating shaft 23 includes the second recess portion 24 on the second end surface F2 (see FIGS. 1 and 2). In the rotating shaft, the second recess portion 24 may be omitted. In this case, a recess portion may be formed on an end surface of the retaining portion. For example, this recess portion is formed at a central position in the radial direction of an end surface of the retaining portion on the second side in the lamination direction. The end surface of the retaining portion on the second side in the lamination direction is a surface facing the second end surface of the rotating shaft. In the sliding element 81, a part of the sliding element 81 is housed in this recess portion. In this state, the sliding element 81 is in contact with the second end surface of the rotating shaft. A formation position of the previously-mentioned recess portion in the retaining portion may be a position deviating from the central position in the radial direction. The number of positions on the second end surface of the rotating shaft with which the sliding element 81 is in contact is increased from one in the state where the rotor 20 is rotating. On the second end surface of the rotating shaft, the contact position with the sliding element 81 changes. Hence, it is possible to suppress the occurrence of local wear-out on the second end surface of the rotating shaft.

(4) The rotating shaft 23 is provided at the central position in the radial direction of the second end surface F2 with the second recess portion 24. On the second end surface of the rotating shaft, the position of the second recess portion may be a position deviating from the central position in the radial direction. If the second recess portion is provided at such a position, the sliding element 81 housed in the second recess portion goes around on the retaining portion 82 with the rotation of the rotor. Therefore, the number of positions, with which the sliding element 81 is in contact, of the retaining portion 82 is increased from one. On the retaining portion 82, the contact position with the sliding element 81 changes. Hence, the wearing out of the retaining portion 82 can be suppressed. In other words, it is possible to suppress the occurrence of local wear-out on the retaining portion 82.

(5) The number of the sliding elements 81 is set to one (see FIGS. 1 and 2). The number of the sliding elements 81 may be more than one. For example, a plurality of the second recess portions is provided on the second end surface of the rotating shaft. The plurality of the second recess portions is concentrically arranged centered at the central position in the radial direction on the second end surface of the rotating shaft. However, the plurality of the second recess portions may be arranged differently from the concentric arrangement. In a case of the plurality of the second recess portions, one of the plurality of the second recess portions may be provided at the central position in the radial direction on the second end surface of the rotating shaft as in the above description. The plurality of the sliding elements 81 is housed in the plurality of the second recess portions, respectively. In addition, the plurality of the sliding elements 81 may be housed in one second recess portion. In this case, the second recess portion is formed into a shape corresponding to an arrangement in a case where the plurality of the sliding elements 81 is gathered. Having the plurality of the sliding elements 81 enables an increase in the number of contact surfaces between the sliding elements 81 and the retaining portion 82. It becomes possible to stabilize the contact between the sliding elements 81 and the retaining portion 82.

(6) The sliding element 81 is formed into a sphere (see FIGS. 1 and 2). The sliding element may be formed into, for example, a cylindrical or tubular shape. In addition, the sliding element may be formed into a cuboid or cubic shape. If the sliding element is formed into not a sphere but each of the previously-mentioned shapes, the sliding element is provided in a state where an axial direction of the sliding element agrees with the lamination direction. In this case, contact between the sliding element and the retaining portion 82 is surface contact. It becomes possible to stabilize the contact between the sliding element and the retaining portion 82. The sliding element may be formed of, for example, carbon.

(7) The biasing portion 83 is set to be a wave washer (see FIGS. 1 and 2). The biasing portion is simply required to be configured in a manner capable of biasing the retaining portion 82 toward the second side in the lamination direction. For example, the biasing portion may be an elastic body such as a spring or rubber. However, also in this case, the biasing portion is formed of a conductive material such as metal or conductive rubber.

(8) Although the description is omitted above, a countermeasure against electrolytic corrosion of the second rolling bearing 70, the countermeasure being different from one in the case of the first rolling bearing 60, may be taken in the motor 10. A known structure that can reduce electrolytic corrosion can be employed. For example, the above-mentioned known rolling bearing including a seal plate of conductive flexible material may be employed. It may be a rolling bearing including a rolling element made of a non-conductive material such as ceramic. An insulator formed of an electrically insulating material may be used to electrically insulate the rotating shaft 23 and the second inner ring 71 of the second rolling bearing 70, or the second outer ring 72 of the second rolling bearing 70 and the second housing 50.

The invention claimed is:
1. A motor including a rotor supported in a rotatable state and a stator, comprising:
a housing provided to a portion of the stator, the portion being on a first side in a lamination direction in which electrical steel sheets forming a rotor core of the rotor are laminated, the housing including a tubular chamber, and formed of a conductive material;
a rolling bearing including an inner ring formed of a conductive material, an outer ring formed of a conductive material, and a rolling element formed of a conductive material, the inner ring being attached to an end portion of a rotating shaft formed of a conductive material of the rotor on the first side in the lamination direction in a state of not being in contact with a first end surface of the tubular chamber on the first side in the lamination direction, the outer ring being fitted onto an inner peripheral surface of the tubular chamber in a state of being in contact with the first end surface of the tubular chamber;

a sliding element formed of a conductive material and provided in the lamination direction between a second end surface of the rotating shaft on the first side in the lamination direction and the first end surface of the tubular chamber;

a retaining portion formed of a conductive material and provided in the lamination direction between the sliding element and the first end surface of the tubular chamber; and a biasing portion formed of a conductive material, provided in the lamination direction between the retaining portion and the first end surface of the tubular chamber, and configured to bias the retaining portion toward a second side in the lamination direction, wherein the rotating shaft and the housing are electrically connected by the sliding element, the retaining portion, and the biasing portion.

2. The motor according to claim 1, wherein the housing chamber includes a first recess portion in an area, which is not in contact with the outer ring, of the first end surface of the housing chamber, and the retaining portion and the biasing portion are housed in the first recess portion.

3. The motor according to claim 1, wherein the rotating shaft includes a second recess portion on the second end surface of the rotating shaft, and the sliding element is provided between the second end surface of the rotating shaft and the first end surface of the tubular chamber in a state where a part of the sliding element is housed in the second recess portion.

4. The motor according to claim 3, wherein the second recess portion is provided at a central position in a radial direction of the rotating shaft, of the second end surface of the rotating shaft.

5. The motor according to claim 1, wherein the sliding element is a sphere.

6. The motor according to claim 2, wherein the rotating shaft includes a second recess portion on the second end surface of the rotating shaft, and the sliding element is provided between the second end surface of the rotating shaft and the first end surface of the tubular chamber in a state where a part of the sliding element is housed in the second recess portion.

7. The motor according to claim 6, wherein the second recess portion is provided at a central position in a radial direction of the rotating shaft, of the second end surface of the rotating shaft.

8. The motor according to claim 2, wherein the sliding element is a sphere.

9. The motor according to claim 3, wherein the sliding element is a sphere.

10. The motor according to claim 4, wherein the sliding element is a sphere.

11. The motor according to claim 6, wherein the sliding element is a sphere.

12. The motor according to claim 7, wherein the sliding element is a sphere.

* * * * *